UNITED STATES PATENT OFFICE.

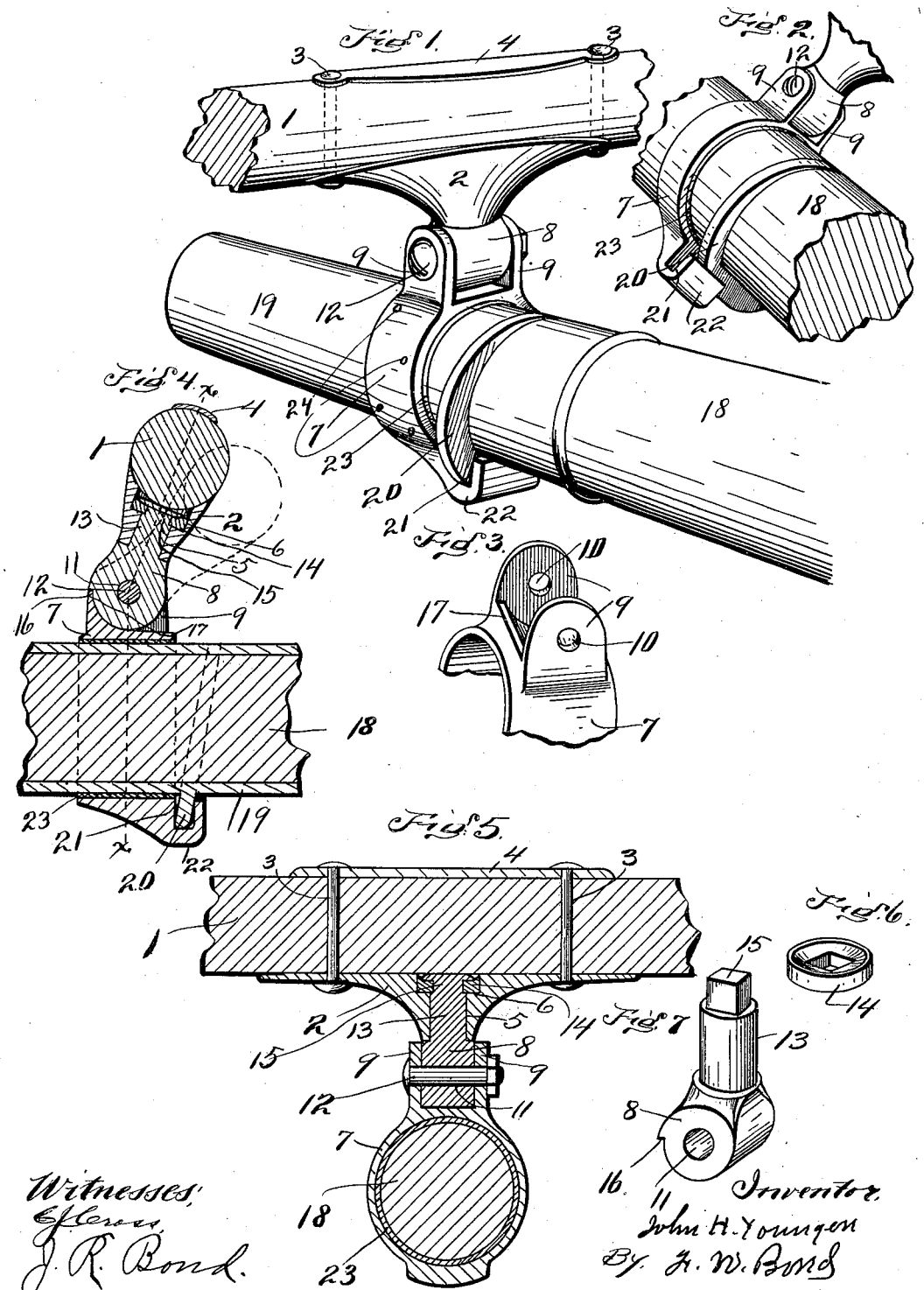

JOHN H. YOUNGEN, OF CANTON, OHIO, ASSIGNOR OF TWO-THIRDS TO EDWARD A. ROCKHILL AND FRANK E. D. KEPLINGER, OF SAME PLACE.

NECK-YOKE.

SPECIFICATION forming part of Letters Patent No. 658,079, dated September 18, 1900.

Application filed January 26, 1900. Serial No. 2,832. (No model.)

*To all whom it may concern:*

Be it known that I, JOHN H. YOUNGEN, a citizen of the United States, residing at Canton, in the county of Stark and State of Ohio, have invented certain new and useful Improvements in Neck-Yokes; and I do hereby declare that the following is a full, clear, and exact description of the same, reference being had to the annexed drawings, making a part of this specification, and to the figures of reference marked thereon, in which—

Figure 1 is a view showing a portion of the neck-yoke and tongue and illustrating the relative positions of the different parts. Fig. 2 is a view showing the tongue-ring partially turned upon the tongue. Fig. 3 is a view showing the upper portion of the tongue-ring and its connecting-socket. Fig. 4 is a sectional view showing a transverse section of the yoke and a longitudinal section of a portion of the tongue. Fig. 5 is a view showing a longitudinal section of the yoke and a transverse section of the tongue on line $xx$, Fig. 4. Fig. 6 is a detached view of the washer or connecting-head. Fig. 7 is a detached view of the coupling-head.

The present invention has relation to neck-yokes; and it consists in the different parts and combination of parts hereinafter described, and particularly pointed out in the claims.

Similar numerals of reference indicate corresponding parts in all the figures in the drawings.

In the accompanying drawings, 1 represents the neck-yoke, which may be of any desired construction, reference being had to the attachment of the parts hereinafter described.

To the bottom or under side of the neck-yoke 1 is securely attached the plate 2, the top or upper portion of which is formed concaved, so as to fit upon the bottom or under side of the yoke 1, as illustrated in Fig. 4, said plate 2 being securely held by means of the rivets 3 and the tie-plate 4. The plate 2 is provided with the opening or aperture 5, at the upper portion of which aperture is formed a chamber 6.

The tongue-ring 7 is substantially the form shown, and, as shown, it is to be placed upon the front or forward end of the tongue, as illustrated in the drawings, and for the purpose of pivotally connecting the coupling-head 8 to the tongue-ring proper said tongue-ring is provided with the ears or members 9, which ears are provided with the apertures 10. The coupling-head 8 is provided with the aperture 11, said apertures 11 and 10 being for the purpose of receiving the connecting-bolt 12, said connecting-bolt being connected and located as arranged in Figs. 1, 4, and 5, by which arrangement a hinged connection is produced between the tongue-ring 7 and the head 8. The head 8 is provided with the shank 13, which shank is extended through the aperture 5, formed in the plate 2, and for the purpose of providing a swivel connection the shank 13 is formed round, which corresponds with size and shape of the aperture 5.

For the purpose of holding the head 8 and its shank 13 in proper fixed position with reference to the plate 2 the washer or connecting-head 14 is provided, which washer or connecting-head is located upon the angled portion 15 of the shank 13 and the upper part of said angled portion swaged, as illustrated in Fig. 5.

For the purpose of providing room for the swaged part of the angled portion 15 the coupling-head 14 is dished upon its upper side, as illustrated, thereby providing room for the swaged head and at the same time leaving a smooth surface upon the upper concave face of the plate 2 and allowing the yoke 1 to fit said concave portion.

For the purpose of limiting the forward movement of the yoke 1 upon its hinged bolt 12, the shoulder 16 is formed upon the head 8, which shoulder comes in contact with the ledge 17, located between the ears 9, formed upon the tongue-ring 7, thereby limiting the forward movement of the yoke 1.

Upon the front or forward end of the tongue 18 is located the thimble 19, which thimble is connected in the ordinary manner, and, as shown, it is provided with the flange 20, which flange increases in width from its top portion toward the bottom or lower portion thereof, said flange being for the purpose of holding the tongue-ring 7 in proper position upon the thimble 19 by means of the groove 21, formed in the rearwardly-extending arm 22, said arm 22 being formed integral with the tongue-ring 7.

It will be understood that by my peculiar arrangement the tongue-ring 7, together with its yoke and different parts, will be held against backward-and-forward movement when the different parts are located as illustrated in Fig. 1.

In order to remove the yoke 1, together with its different parts, said yoke is tilted or turned, thereby rotating the ring upon the thimble 19, said ring being rotated until the groove 21 has been disengaged from the flange 20, after which the yoke and ring can be removed.

To place the yoke upon the tongue, it will be understood that the tongue-ring 7 must be turned in a position to allow the groove 21 to come directly over the flange 20, after which said ring, together with its different parts, is brought into the position illustrated in Fig. 1.

For the purpose of cushioning the inner surface of the tongue-ring 7 the leather lining 23 is provided, which lining is held in position by means of suitable rivets, such as 24. It will be understood that by providing the rearwardly-extending arm 22 and providing the same with the groove 21 the neck-yoke proper will not become detached from the tongue in case one or more of the tugs should become detached from the whiffletrees.

In the drawings the tongue-ring is shown spaced from the flange 20 of the thimble 19; but in actual use said tongue-ring will rest against the forward face of the flange 20.

Having fully described my invention, what I claim as new, and desire to secure by Letters Patent, is—

The combination of the yoke 1 having connected thereto the plate 2 provided with an aperture, the head 8 provided with the shank 13 having an angled portion 15, a washer or connecting-head fixed upon the angled portion and seated in the plate 2, a tongue-ring provided with ears and the head pivotally connected to said ears, and means for limiting the movement of the head upon its pivotal connection, substantially as and for the purpose specified.

In testimony that I claim the above I have hereunto subscribed my name in the presence of two witnesses.

JOHN H. YOUNGEN.

Witnesses:
J. A. JEFFERS,
E. A. ROCKHILL.